United States Patent [19]

Eller

[11] Patent Number: 4,718,286

[45] Date of Patent: Jan. 12, 1988

[54] DYNAMOMETER SYSTEM FOR ROTARY BLADE-TYPE LAWM MOWERS

[76] Inventor: Dwain I. Eller, 431 48th Street Ct. East, Bradenton, Fla. 33508

[21] Appl. No.: 881,791

[22] Filed: Jul. 3, 1986

[51] Int. Cl.$^4$ .......................... G01L 3/20; G01L 3/18; G01L 3/22

[52] U.S. Cl. ............................. 73/862.14; 73/862.12; 73/862.17

[58] Field of Search ........... 73/862.09, 862.12, 862.14, 73/862.15, 862.17, 862, 116, 865.9, 117.1

[56] References Cited

U.S. PATENT DOCUMENTS 3,969,931 7/1976 Lanning ........................... 73/862.14

FOREIGN PATENT DOCUMENTS 487330 10/1975 U.S.S.R. ........................... 73/862.14

Primary Examiner—Charles A. Ruehl
Attorney, Agent, or Firm—Charles J. Prescott

[57] ABSTRACT

A dynamometer system for applying a controlled variable operating load against the blade of a rotary-type lawn mower while the mower is in stationary operation atop the system. The system includes a frame for supporting and securing the lawn mower thereupon, a dynamometer having an input shaft connected to the frame, the input shaft of the dynanometer including at its distal end a rotary-type blade engaging crossbar. By this arrangement, a controlled load may be applied by the dynanometer against the rotating blade and thus the motor of the lawm mower while it is operating in stationary position atop the frame to aid in testing, diagnosing problems, and adjusting the motor. The dynamometer is preferably hydraulic, although it may also be of the electric absorption or mechanical absorption type. The hydraulic dynamometer also includes a reservoir and filled with hydraulic fluid in fluid communication with a closed loop fluid circulating system whereby hydraulic fluid is drawn from the reservoir through the dynamometer and returned back to the reservoir for continual recycling. The hydraulic fluid exiting the dynamometer may be restricted by valve means in the closed loop fluid circuit which also includes fluid flow and pressure measuring means which produces information relative to motor horsepower output values. This restricting valve provides means for controlled variability of the power absorbed by the dynamometer.

6 Claims, 6 Drawing Figures

DYNAMOMETER SYSTEM FOR ROTARY BLADE-TYPE LAWM MOWERS

BACKGROUND OF THE INVENTION

This invention relates generally to dynamometers for absorption of the rotary output of a motor, and more particularly to a diagnostic dynamometer system for rotary blade-type or rotary motor driven lawn mowers.

It is well-known that, during the life of the motor of a machine such as a lawn mower, the rotary power output of such a motor will vary and may deteriorate based upon wear and environmental conditions. Although many of the worn components and deteriorated conditions may easily be repaired by conventional methods, procedures and replacement parts, the motor may typically only be operated, observed and adjusted in a "no-load situation" unless the motor is removed from the lawn mower deck to a test stand. However, many operating defects are only incurred under a partial or full load condition of such a motor.

Many systems have been developed which will apply a load to the motor of a machine such as the dynamometer for automobiles which will apply controlled loads to the drive wheels of such a vehicle. This loading is important for diagnosing operating defects, locating and replacing worn components and correcting mis-adjustments which might be unobservable during the normal operation of the vehicle over the road or in a static "no load"situation. With respect to lawn mowers, then, particularly the rotary blade-type, the only effective way known to applicant to load the motor of such lawn mowers in order to at least observe functional mis-adjustments and defects short of motor removal to a test stand is to actually run the mower through heavy grass or other heavy ground cover. This loading is applied to the motor via the grass cutting process to the rotating blade of such mowers.

Certain motors are equipped with a separate power takeoff which may be interengaged by a separate power absorption system. This power take-off accessory does provide a convenient means for applying a load to the motor in a controlled environment. However, the majority of the smaller less sophisticated mowers and equipment, as well as small diesel powered mowers, do not include any such power takeoffs.

In order to get any semblance of continuous loading on rotary mowers, then, the mower must be operationally loaded by continually moving the mower through heavy grass or ground cover. This presents the very practical problem of observing, diagnosing, adjusting, and so forth, a moving mower in the field, a difficult task at best.

The present invention provides a dynamometer system upon which such rotary blade-type lawn mowers may be placed, interengaged thereto, and secured thereon, after which the motor of the mower may be operated and observed, adjusted and repaired. A dynamometer connected beneath the support frame for the mower includes an input shaft which has connected thereto a blade engaging crossbar. Thus, by adjusting the power absorption controls related to the dynamometer, a variable load may be placed on the motor of the mower on a selectable steady state basis so that adjustments, repairs and observations may be made in this controlled situation, usually in a shop.

BRIEF SUMMARY OF THE INVENTION

This invention is directed to a dynamometer system for applying a controlled variable operating load against the blade of a rotary-type lawn mower while the mower is in stationary operation atop the system. The system includes a frame for supporting and securing the lawn mower thereupon, a dynamometer having an input shaft connected to the frame, the input shaft of the dynamometer including at its distal end a rotary-type blade engaging crossbar. By this arrangement, a controlled load may be applied by the dynamometer against the rotating blade and thus the motor of the lawn mower while it is operating in stationary position atop the frame to aid in testing, diagnosing problems, and adjusting the motor. The dynamometer is preferrably hydraulic, although it may also be of the electric absorption or mechanical absorption type. The hydraulic dynamometer also includes a reservoir filled with hydraulic fluid in fluid communication with a closed loop fluid circulating system whereby hydraulic fluid is drawn from the reservoir through the dynamometer and returned back to the reservoir for continual recycling. The hydraulic fluid exiting the dynamometer may be restricted by valve means in the closed loop fluid circuit which also includes fluid flow and pressure measuring means which produces information relative to motor horsepower output values. This restricting valve provides means for controlled variability of the horsepower absorbed by the dynamometer.

It is therefore an object of this invention to provide a dynamometer system adapted to receive and absorb power from the rotating blade of a stationary mounted rotary-type lawn mower.

It is another object of this invention to provide the above dynamometer system for use in conjunction with a completely assembled rotary type lawn mower.

It is another object of the above invention to provide variable loading means by interconnection of the dynamometer to the rotating blade of a rotary-type lawn mower to aid in servicing and diagnosing operational deficiencies of the motor of the lawn mower.

It is another object of this invention to provide a test dynamometer system which is relatively inexpensive to install in small lawn mower service shops to provide a means for such small lawn mower service shops to apply an operating load to rotary-type lawn mowers not having power take-off accessories to aid in diagnosing and servicing such lawn mowers.

In accordance with these and other objects which will become apparent hereinafter, the instant invention will now be described with reference to the accompanying drawings in which:

DETAILED DESCRIPTION OF THE INVENTION

Figure 1:
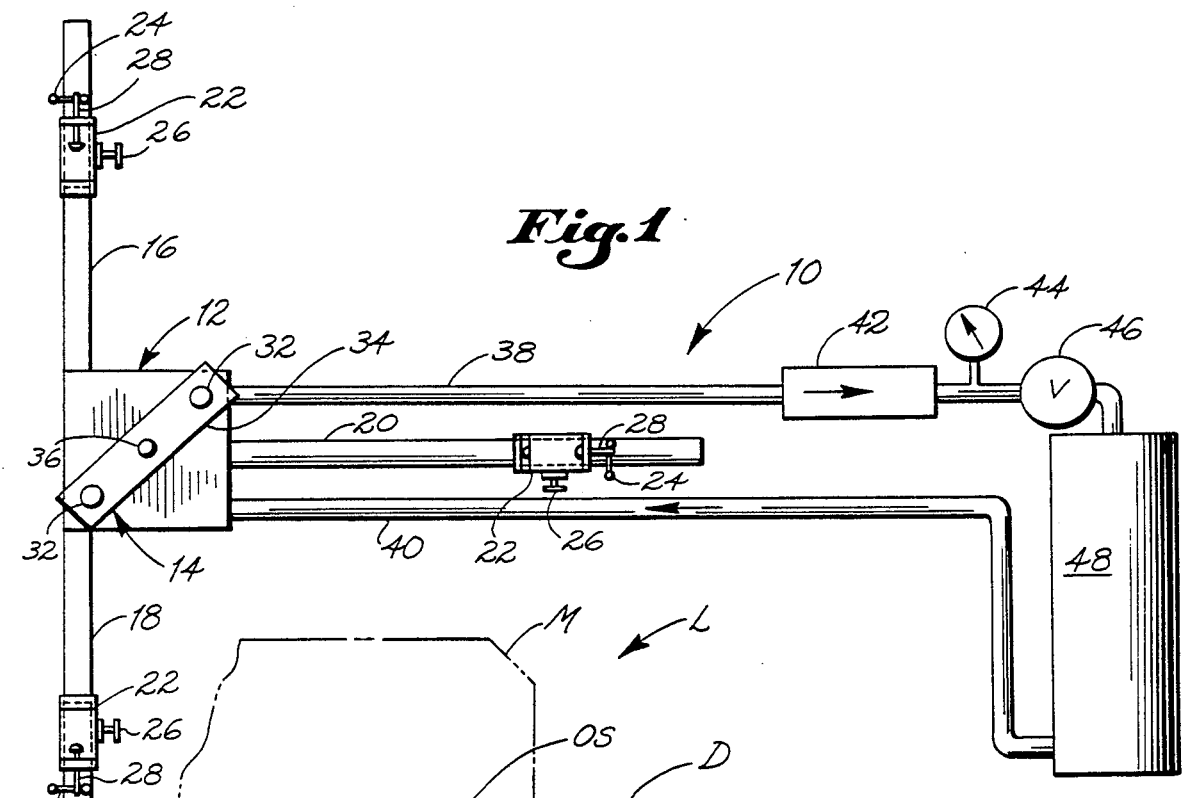
FIG. 1 is a schematic view of one embodiment of the dynamometer system.
Figure 2:
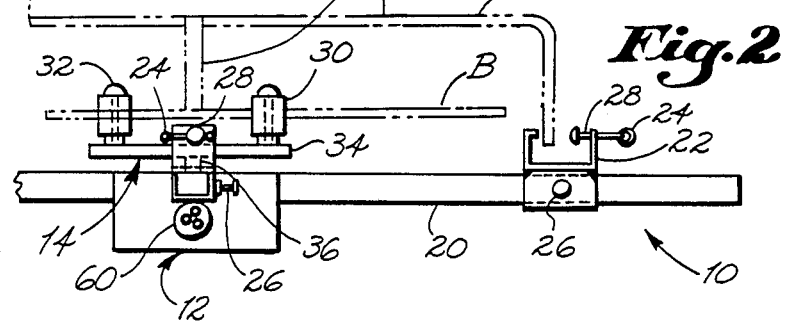
FIG. 2 is a partial left end elevation view of the dynamometer system described in FIG. 1 and including a partial representation of a rotary mower installed thereon shown in phantom.

Referring now to the drawings, and particularly to FIGS. 1 and 2, one embodiment of the invention is shown generally at numeral 10 and includes a hydraulically actuated dynamometer 12 having a rotary blade-type mower blade engaging plate 14 mounted for rotation about input shaft 36 which is interconnected to the interior pump portion 60 of the hydraulic dynamometer 12. The dynamometer 12 is connected to frame members 16, 18 and 20 which are disposed at ninety degrees one to another and generally perpendicularly to the axis of shaft 36. Slidably mounted over each frame member 16, 18 and 20 is clamp means 22 which includes threaded positioning lock 26 and threaded mower engaging shaft 28 having handle 24. Clamps 22 may be positioned anywhere along the length of the respective frame members 16, 18 and 20 and secured in the desired position by positioning lock 26.

The dynamometer system 10 also includes fluid inlet conduit 40 and fluid outlet conduit 38 which interconnect the dynamometer pump 60 inlet and outlet respectively to reservior 48. Positioned along the outlet or high pressure conduit 38 are flow meter 42, pressure gauge 44 and valve 46.

By this arrangement, then, a closed or continuous loop of hydraulic fluid conveyance is provided so that, as shaft 36 is rotated and dynamometer pump 60 actuated, hydraulic fluid flows in the direction of arrows circulating the hydraulic fluid from reservoir 48 through inlet conduit 40 and returning to the reservoir 48 through outlet conduit 38. By providing valve 46, a controlled variable restriction to hydraulic fluid flow, and thus variable load on blade B, is provided.

As best seen in FIG. 2, a rotary blade-type lawn mower L is positioned atop the dynamometer system 10 such that the elongated rotary blade B mounted at the end of output shaft OS is positioned over blade engaging crossbar 14 and diagonally between and within upright posts 32 having cushions 30 therearound. By this arrangement, then, as motor M operates, causing output shaft OS and blade B to rotate, crossbar 14 is also forced to rotate via contact of blade B with cushions 30 and uprights 32. The dynamometer input shaft 36 is simultaneously driven by crossbar 14, actuating dynamometer 12 and causing the hydraulic fluid to begin to flow in proportion to the speed and power input delivered from the motor M.

To absorb the torque reaction and to retain the lawn mower L in a rigid position, slide clamps 22 have been positioned along frame members 16, 18 and 20 and engagable with the mower deck D of the lawn mower L by the tightening of mower engaging shaft 28 by handle 24 against the lower side margin of deck D. Positioning locks 26, suitably tightened onto frame members 16, 18 and 20 then secure the lawn mower L ready for operation in conjunction with the dynamometer system 10.

Thus, as the motor M is operated, hydraulic fluid begins and continues to flow through the closed fluid conduit circuit as previously described and in proportion to both motor horsepower output and the setting of valve 46. By regulating valve 46, the amount of power absorbed from motor M is regulated. Note that, a motor start-up valve 46 is opened fully to minimize motor loading.

The preferred embodiment of hydraulic dynamometer 12 is that of a positive displacement gear type hydraulic pump with an approximate output capacity of thirty gallons per minute and which will produce a maximum output pressure of 2,500 p.s.i. This size and type of hydraulic pump has been determined to be sufficiently large to absorb the horsepower of most typical lawn mowers and lawn tractors.

As the horsepower output of motor M is increased, fluid flow into outlet conduit 38 is increased. To increase the amount of horsepower absorbed from motor M, the restriction to flow is increased by partially closing valve 46. The operator, having knowledge of the proper speed and load settings, in conjunction with the observation of associated diagnostic equipment such as a tachometer, may readily adjust the valve 46 to properly load the motor M to an intermediate or maximum horsepower steady state operational condition. Once this steady state loading is achieved, the fluid flow and pressure output in outlet conduit 38 may be observed by flow meter 42 and pressure gauge 44.

It should be now readily understood that, by providing this invention, the user may not only apply an operating load to rotary blade-type lawn mowers in a controlled shop environment, but may also, by observing the flow rate and pressure of the output of the dynamometer 12, in conjunction with other variables which may be measured or assumed, such as fluid mass and temperature and dynamometer pump efficiency, the horsepower output of the motor M may be determined and compared to the motor manufacturers' specifications. The user may both refine the adjustments to maximize the horsepower output of motor M and may also compare that quantitative horsepower output to determine the degree of wear as an aid in the decision as to whether to rebuild or replace a worn motor M.

Figure 3:
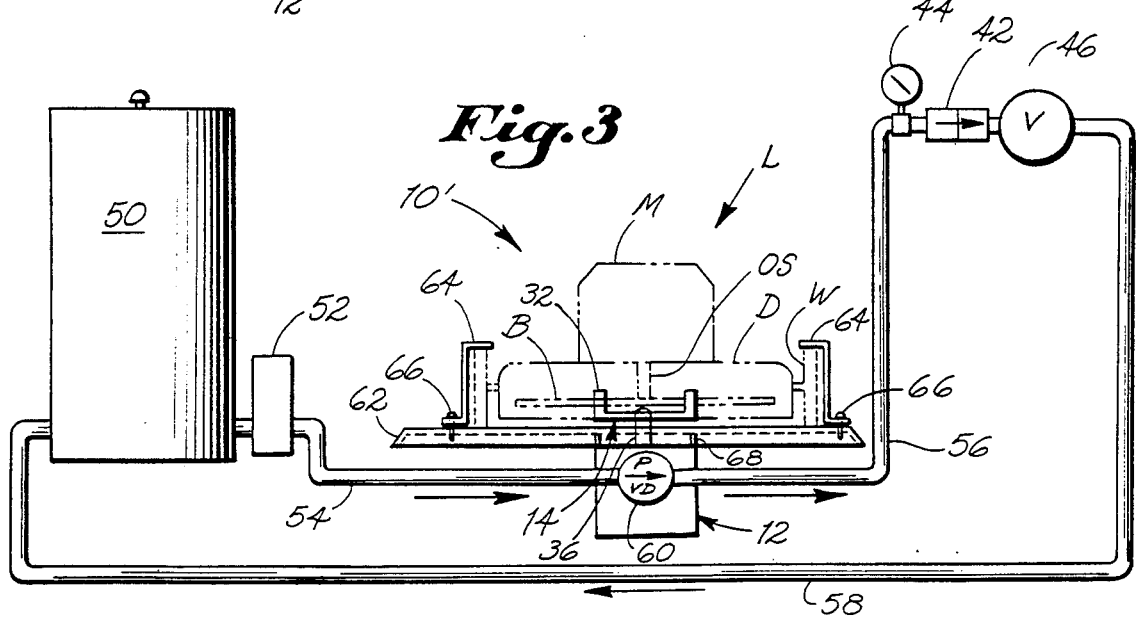
FIG. 3 is a side elevation view of another embodiment of the invention.

Referring now to FIG. 3, an alternate embodiment of the dynamometer system is shown generally at 10' and also includes a hydraulic dynamometer 12 interconnected to reservoir 50 by inlet conduit 54 and outlet or return conduit 58 having gauge 44, flow meter 42 and valve 46 arranged and functioning as previously described. This embodiment 10' also includes a platform 62 which supports the entire lawn mower L thereupon. Blade B interengages and drives crossbar 14 as previously described. However, wheel clamps 64 are provided in this embodiment to restrain the lawn mower L in rigid and secure position during operation and testing. These wheel clamps 64 surround at least two of the wheels W and are secured to the platform 62 by bolts 66.

Figure 4:
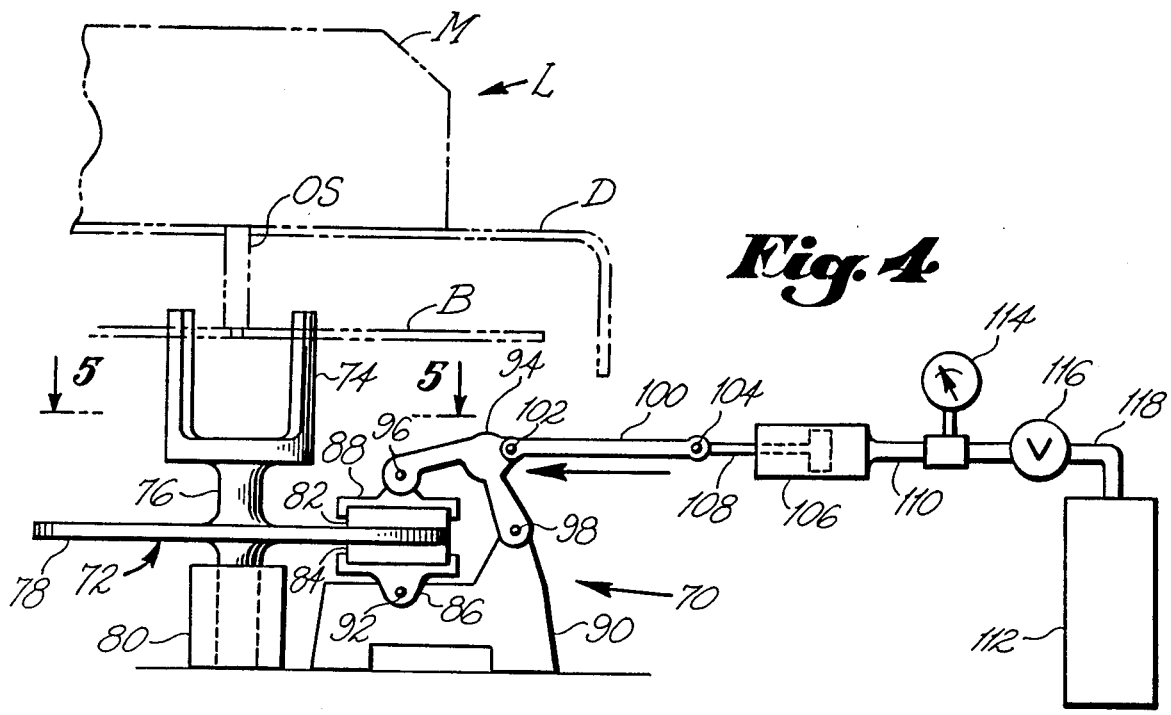
FIG. 4 is a schematic view of a mechanical embodiment of the dynamometer system.
Figure 5:
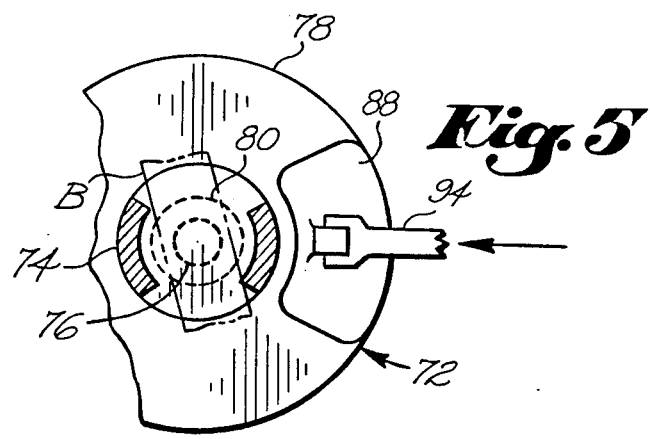
FIG. 5 is a section view of the direction of arrows 5—5 in FIG. 4.

Although a hydraulic dynamometer is generally preferred, the dynamometer may also be in the form of either a mechanical absorption type or an electric absorption type. In either of these alternates, the primary feature providing adjustable controlled load applied to absorb the rotational torque output via the blade B is preferred. Referring now to FIGS. 4 and 5, a mechanical embodiment of the invention is shown generally at 70 and includes a disk brake assembly 72 having a plate or disk-like structure 78 which has a shaft 76 disposed in both directions. The lower portion of shaft 76 is supported for rotation by bearing housing 80. The upper portion of shaft 76 includes coupling fork 74 which engages the lawn mower blade B for absorpotion of output shaft OS output as previously described.

Disk friction pads 82 and 84 are disposed on either side of the disk 78 held thusly in housings 88 and 86 respectively. Pad housing 86 is pivotally connected to base 90 at pin 92, while pad housing 88 is pivotally connected to yoke 94 at pin 96. The other arm of yoke 94 is pivotally connected at 98 to base 90 such that, when activator rod 100 is forced in the direction of the arrow by pneumatic piston 108 in cylinder 106 by air pressure contained in tank 112, balanced friction force is applied against either side of the disk 78 so as to provide a variable power absorbtion capability from motor M and output shaft OS as previously described. Air valve 116 connected to tank 112 by conduit 118 provides variable pneumatic pressure into cylinder 106, the gauge 114 connected between valve 116 and cylinder 106 by conduit 110 providing means for calculating power absorption in horsepower also as previously described.

Figure 6:
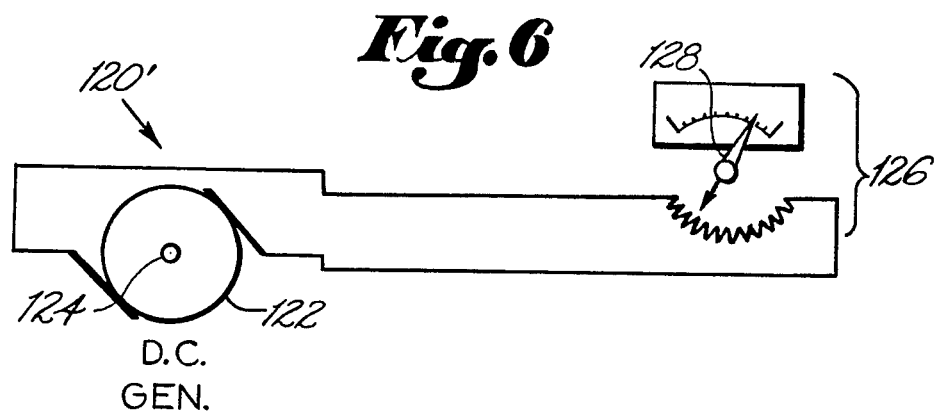
FIG. 6 is a schematic view of an electrical embodiment of the dynamometer system.

Referring lastly to FIG. 6, a schematic of an electrical embodiment of the invention is shown generally at 120 including DC generator 122 adapted to absorb rotary input through shaft 124 which, in turn is coupled to the blade B and output shaft OS of the lawn mower L as previously described. Resistive bank 126 is provided as a means for absorbing and dissipating the electrical power output of the DC generator 122, that power absorption being variable by dial 128 which controls the current absorbed by the resistive bank 126.

While the instant invention has been shown and described herein in what is conceived to be the most practical and preferred embodiment, it is recognized that departures may be made therefrom within the scope of the invention, which is therefore not to be limited to the details disclosed herein, but is to be accorded the full scope of the claims so as to embrace any and all equivalent apparatus and articles.

What is claimed is:

1. A dynamometer system for applying a selectable operating load on a rotary-type lawn mower having a motor mounted atop a housing and an output shaft downwardly extending from the motor through the housing, the output shaft having a generally horizontally disposed elongated blade connected thereto at the mid-point of the blade, said system comprising:

lawn mower support means for supportively receiving and securing a rotary-type lawn mower thereupon;

a dynamometer connected to said lawn mower support means and having an input shaft adapted to be operatively engagable with the blade of a rotary-type lawn mower such that said dynamometer input shaft is rotationally driven during the lawn mower operation;

said dynamometer for absorbing a selectable work load output from the lawn mower motor during operation.

2. A dynamometer system as set forth in claim 1, wherein:

said dynamometer system also includes horsepower measuring means.

3. A dynamometer system as set forth in claim 1, wherein:

said dynamometer is hydraulic.

4. A dynamometer system as set forth in claim 1, wherein:

said dynamometer is electric.

5. A dynamometer system as set forth in claim 1, wherein:

said dynamometer is mechanical.

6. A dynamometer system for applying a selectable operating load on a rotary-type lawn mower having a motor mounted atop a housing and an output shaft downwardly extending from the motor through the housing, the output shaft having a generally horizontally disposed elongated blade connected thereto at the mid-point of the blade, said system comprising:

a frame for supporting and securing the lawn mower;

a hydraulic pump having an input shaft and connected to said frame such that said input shaft extends upwardly from said frame;

said hydraulic pump in fluid communication with a source of hydraulic fluid pumped by said hydraulic pump in response to rotation of said input shaft;

said input shaft distal end having a blade engaging means connected thereto for engaging the mower blade such that said input shaft is rotated responsive to blade rotation;

fluid control means for regulating and measuring the flow and pressure of fluid flowing out of said hydraulic pump responsive to blade rotation.

* * * * *